(12) United States Patent
Zerfass et al.

(10) Patent No.: US 10,740,883 B2
(45) Date of Patent: Aug. 11, 2020

(54) BACKGROUND COMPENSATION

(71) Applicant: QIAGEN GMBH, Hilden (DE)

(72) Inventors: Thorsten Zerfass, Mülheim an der Ruhr (DE); Björn Labitzke, Cologne (DE); Maiko Lohel, Hilden (DE)

(73) Assignee: QIAGEN GmbH, Hilden (DE)

( * ) Notice: Subject to any disclaimer, the term of this patent is extended or adjusted under 35 U.S.C. 154(b) by 22 days.

(21) Appl. No.: 16/060,881

(22) PCT Filed: Dec. 9, 2016

(86) PCT No.: PCT/EP2016/080513
§ 371 (c)(1),
(2) Date: Jun. 8, 2018

(87) PCT Pub. No.: WO2017/098015
PCT Pub. Date: Jun. 15, 2017

(65) Prior Publication Data
US 2019/0012773 A1    Jan. 10, 2019

(30) Foreign Application Priority Data
Dec. 10, 2015 (EP) .................................... 15199402

(51) Int. Cl.
*G06T 5/20* (2006.01)
*G06T 5/00* (2006.01)
*G06T 5/50* (2006.01)

(52) U.S. Cl.
CPC ................ *G06T 5/20* (2013.01); *G06T 5/008* (2013.01); *G06T 5/50* (2013.01);
(Continued)

(58) Field of Classification Search
None
See application file for complete search history.

(56) References Cited

U.S. PATENT DOCUMENTS 5,805,217 A * 9/1998 Lu .......................... G06T 3/4007
348/266
6,961,479 B1 * 11/2005 Takarada .............. G06T 3/4007
382/300
(Continued)

FOREIGN PATENT DOCUMENTS

WO    WO 2008/097455 A1    8/2008
WO    WO 2009/117119 A1    9/2009
(Continued)

OTHER PUBLICATIONS

Klinkert, Ivo, et al. "Methods for full resolution data exploration and visualization for large 2D and 3D mass spectrometry imaging datasets." International Journal of Mass Spectrometry 362 (2014): 40-47. (Year: 2014).*
(Continued)

*Primary Examiner* — Andrae S Allison
(74) *Attorney, Agent, or Firm* — Sterne, Kessler, Goldstein & Fox P.L.L.C.

(57) ABSTRACT

System, method and computer program product for background compensation of a digital image containing at least one first object, the at least one first object having received at least one molecule comprising genetic information, and at least one second object, the at least one second object not having received a molecule comprising genetic information, the at least one molecule being configured to receive a fluorescent compound, the digital image being determined by an optical imaging system during emission of electromagnetic radiation by the fluorescent compound.

16 Claims, 1 Drawing Sheet

(52) U.S. Cl.
CPC ............... *G06T 2207/10064* (2013.01); *G06T 2207/20021* (2013.01); *G06T 2207/30072* (2013.01)

(56) References Cited

U.S. PATENT DOCUMENTS

| | | | | |
|---|---|---|---|---|
| 7,742,640 | B1* | 6/2010 | Carlson | G06K 9/2018 382/173 |
| 2007/0101310 | A1* | 5/2007 | Stirniman | G03F 1/36 716/53 |
| 2009/0141961 | A1* | 6/2009 | Smith | G06K 9/00577 382/135 |
| 2009/0174879 | A1* | 7/2009 | Bloss | G07D 7/1205 356/71 |
| 2010/0323350 | A1 | 12/2010 | Gordon et al. | |
| 2012/0015825 | A1* | 1/2012 | Zhong | G01N 21/6428 506/6 |
| 2012/0077688 | A1* | 3/2012 | Bergo | G01N 33/6845 506/9 |
| 2017/0358163 | A1* | 12/2017 | Clara | G07D 7/1205 |
| 2018/0359432 | A1* | 12/2018 | Horak | H04N 5/33 |
| 2018/0374212 | A1* | 12/2018 | Unterer | G06T 7/0012 |

FOREIGN PATENT DOCUMENTS

| | | |
|---|---|---|
| WO | WO 2014/020137 A1 | 2/2014 |
| WO | WO 2015/054292 A1 | 4/2015 |

OTHER PUBLICATIONS

Sarrafzadeh, Omid, and Alireza Mehri Dehnavi. "Nucleus and cytoplasm segmentation in microscopic images using K-means clustering and region growing." Advanced biomedical research 4 (2015). (Year: 2015).*

Hoogendoorn, Eelco, et al. "The fidelity of stochastic single-molecule super-resolution reconstructions critically depends upon robust background estimation." Scientific reports 4 (2014): 3854. (Year: 2014).*

Chiu, Tai-Yu, et al. "Interpolation based consensus clustering for gene expression time series." BMC bioinformatics 16.1 (2015): 117. (Year: 2015).*

International Search Report and Written Opinion of the International Searching Authority directed to related international Patent Application No. PCT/EP2016/080513, dated Aug. 3, 2017; 10 pages.

International Preliminaiy Report on Patentability directed to related International Patent Application No. PCT/EP2016/080513, dated Jun. 12, 2018; 7 pages.

"Dynabeads Magnetic Separation Technology," ThermoFisher Scientific; 2 pages.

Kothe et al.: "SimpleSTORM: a fast self-calibrating reconstruction algorithm for localization microscopyn," Histochemistry and Cell Biology, Apr. 11, 2014, Vol, 141, No. 6, pp. 613-627.

Metzker, "Sequencing technologies—the next generation," Nature Reviews Genetics, Jan. 2010, vol. 11, pp. 31-46.

Russuvuori et al., "Evaluation of methods for detection of fluorescence labeled subcellular objects in microscope images," BMC BioInformatics, Biomed Central, May 13, 2010, Vol, 11, No. 1 ; 17 pages.

Voelkerding et al., "Next-Generation Sequencing: From Basic Research to Diagnostics," Clinical Chemistiy, Mar. 2009, vol. 55, No. 4, pp. 641-658.

* cited by examiner

BACKGROUND COMPENSATION

BACKGROUND COMPENSATION

The present invention relates to systems and methods for background compensation of a digital image containing at least one first object and at least one second object. More particularly, the present invention relates to background compensation of a digital image being determined by an optical imaging system during emission of electromagnetic radiation by a fluorescent compound, preferably for DNA/RNA-sequencing, wherein autofluorescence effects play a role.

Biotechnology, medicine and related technical fields are based on the analysis of molecules. Electronic devices can analyse molecules with high precision and specificity. Especially in last years, automated electronic devices have been developed for analysing large numbers of samples by routine methods. For example, modern DNA sequencing apparatus are used for routine analysis of large numbers of DNA probes. Protein samples can be analysed by high throughput screening and related methods. Frequently, such electronic devices detect fluorescent signals emitted from the sample probes. This is possible when molecules, such as nucleic acids or proteins, have been labelled with fluorescent compounds such as dyes.

Commercially available sequencing apparatus are capable of sequencing large numbers of samples labelled with fluorescent dyes in parallel. Recently developed methods, referred to as "next-generation sequencing", NGS, have revolutionized sequencing. NGS allows the massively parallel sequencing of clonally amplified or single DNA molecules that are spatially separated in a flow cell or by generation of an oil-water emulsion. NGS allows thousands or even millions to billions of sequencing reactions to be performed simultaneously.

In NGS, sequencing is performed by repeated cycles of polymerase-mediated nucleotide extensions or, in one format, by iterative cycles of oligonucleotide ligation. As a massively parallel process, NGS generates hundreds of megabases to gigabases of nucleotide-sequence output in a single instrument run, depending on the platform. The inexpensive production of large volumes of sequence data is the primary advantage over conventional methods. NGS platforms and common applications/fields for NGS technologies are e.g. reviewed in Voelkerding et al, Clinical Chemistry 55:4 641-658, 2009 and Metzker, Nature Reviews/Genetics Volume 11, January 2010, pages 31-46.

In NGS, various oligonucleotides of interest are covalently attached to a support. Subsequently, a nucleotide labelled with a fluorescent dye is attached to the growing oligonucleotide chain with DNA polymerase. When the four nucleotides are labelled with different fluorescent dyes, fluorescent signals emitted from a probe can be detected and the type of nucleotide attached to the oligonucleotide can be identified. After detection, the fluorescent dye is cleaved off and the next synthesis cycle is carried out, in which a new labelled nucleotide is attached to the growing chain. By carrying out multiple cycles, the sequence of a growing oligonucleotide chain can be determined in a stepwise manner. The working steps are carried out in an automated sequencing apparatus.

US 2010/0323350 A1 and WO 2009/117119 A1 relate to methods and compositions for determining the identity of nucleic acids in nucleotide sequences using, for example, data obtained from sequencing by synthesis methods.

WO 2008/097455 A1 relates to an imaging system for exciting and measuring fluorescence on or in samples comprising fluorescent materials, e.g. fluorescent labels, dyes or pigments, in particular to detect fluorescent labels on nucleic acid. Moreover, a device is disclosed being configured such that fluorescent labels in a plurality of different DNA templates are simultaneously detected.

WO 2014/020137 A1 relates to a method for enriching target sequences from a sequencing library to provide a target enriched sequencing library, wherein the sequencing library is suitable for massive parallel sequencing and comprises a plurality of double-stranded nucleic acid molecules.

Fluorescent signals emitted from sample probes with labelled molecules are weak, but the signals have to be detected with high precision and specificity. Thus, precise optical equipment, especially cameras and scanning technology, is required for such processes.

In addition, extensive evaluation of the digital images captured by an optical imaging system of the sequencing apparatus is necessary for obtaining a precise and reliable result of the sequencing, e.g. in FASTQ.

The observed signal intensities, as determined from the optical imaging system, can be considered to be a sum of independent contributions, e.g. autofluorescence and fluorescence, signal intensity. Further, these intensities are additionally attenuated by a vignetting effect due to uneven illumination and the optical system. In conventional systems without background compensation, these effects lead to a decreased precision in the information obtained from the image, that is, in the precision of the base call in DNA/RNA-sequencing.

It is an object of the invention to provide a method and a system, which overcomes the above mentioned problems of the prior art. In particular, one object is to determine and remove the autofluorescence signal from each observed signal in order to allow a robust and reliable processing in subsequent processing steps.

This object is achieved with the features of the independent claims. The dependent claims relate to further aspects of the invention.

The method according to the present invention is computer-implemented. However, it is understood by the skilled person that there are also other ways of implementing the method according to the present invention.

In one aspect of the present invention a method for background compensation of a digital image containing at least one first object is provided. The at least one first object having received at least one molecule comprising genetic information, and at least one second object, the at least one second object not having received a molecule comprising genetic information. The at least one molecule is configured to receive a fluorescent compound. The digital image is determined by an optical imaging system during emission of electromagnetic radiation by the fluorescent compound. The method comprises the following steps, preferably in the following order:

a) determining first intensity values from the digital image for each object;

b) determining second intensity values from the digital image for the at least one second object within a plurality of predetermined areas;

c) computing median intensity values from the second intensity values for each of the plurality of predetermined areas;

d) interpolating the median intensity values to the size of the original digital image;

e) computing background compensated intensity values for each object by subtracting the interpolated median intensity values from the determined first intensity values.

The objects statuses are preferably determined beforehand and inputted into the method as known parameters. In addition, the object positions are preferably determined from a corresponding white-light image beforehand and might be inputted into the method as known parameters.

The at least one first object is preferably one live-bead having received at least one DNA strand and the at least one second object is preferably one blank-bead not having received a DNA strand. The DNA strand is preferably a single stranded DNA fragment. Such beads are commercially available e.g. from Thermo Fisher Scientific Inc., e.g. under the brand Dynabeads, see reference [1].

Preferably each DNA strand is configured to receive molecules, preferably nucleotides. The nucleotides preferably comprise a cleavable fluorescent compound and a cleavable cap. It is further preferred that the molecules are a plurality of four different molecules each having a fluorescent compound specific for each of the four different molecules.

Each of the plurality of cycles is preferably characterized in that one of the four molecules is attached to one of the DNA strands, wherein the cleavable cap ensures that only one molecule is attached to one DNA strand during one cycle.

It is preferred that for each cycle a plurality of pictures, preferably four, are taken, one for each of the four fluorescent compounds attached to the molecules. It is further preferred that the four fluorescent compounds have one of a main emission spectra in the red, blue, yellow or green spectral regime.

After each of the cycle, the cleavable cap and the fluorescent compound, e.g. a fluorescent dye, are removed so that another molecule can be attached to the DNA strand in the next cycle.

The optical imaging system preferably comprises of an illumination device, e.g. an LED, to activate the fluorescent compound(s) and a detection system, e.g. a CCD detector, to detect the emission spectra of the fluorescent compound(s).

Each of the predetermined areas preferably comprises a plurality of pixels of the original digital image. The predetermined areas correspond to the predetermined positions of the at least one second object. It is preferred that the size of the predetermined areas is approximately the size of the at least one second object, e.g. 2.8 pixel.

The method may further comprise arranging the computed median intensity values in a topological grid structure, preferably a median matrix, based on a position of the at least one second object within the plurality of predetermined areas.

The method might further comprise applying a region growing approach to the computed median intensity values of the plurality of predetermined areas. That is, the method might further comprise applying a region growing approach to the median matrix. A region growing approach might be advantageous to increase the stability of the method, because empty elements in a corresponding matrix representation might be filled.

In particular, empty elements in the median matrix may be present if one or more predetermined area(s) of the plurality of predetermined areas do not contain a second object, i.e. a blank bead. Thus, for that (those) predetermined area(s) no second intensity value is determined and therefore the respective element of the median matrix is empty.

Preferably, the method further comprises applying a median filter to the computed median intensity values of the plurality of predetermined areas. That is, the method further comprises applying a median filter to the median matrix.

It is also preferred that the method further comprises applying a Gaussian filter to the computed median intensity values of the plurality of predetermined areas. That is, the method further comprises applying a Gaussian filter to the median matrix.

Interpolating the median intensity values to the original digital image size preferably comprises a bilinear interpolation. That is, after the interpolation, there is a corresponding median intensity value for each pixel in the original digital image. Even though a bilinear interpolation is preferred, the person skilled in the art knows that other interpolation algorithms might be applied just as well.

The at least one object might be a bead preferably being configured to receive DNA and/or RNA. As already outlined above, the objects might be beads for receiving DNA/RNA strands, which then receive the molecules with their cleavable caps and cleavable fluorescent compounds, e.g. fluorescent dye.

According to a further aspect of the present invention, a computer program product is provided, wherein the computer program product comprises one or more computer readable media having computer executable instructions for performing the steps of the above described method.

According to yet another aspect of the present invention a system for background compensation of a digital image containing at least one first object is provided. The at least one first object having received at least one molecule comprising genetic information, and at least one second object, the at least one second object not having received a molecule comprising genetic information. The at least one molecule is configured to receive a fluorescent compound. The digital image is determined by an optical imaging system during emission of electromagnetic radiation by the fluorescent compound. The system is preferably configured to carry out the steps of any of the method steps described above. The system comprises an intensity determining unit configured to determine first intensity values from the digital image for each object and second intensity values for the at least one second object within a plurality of predetermined areas and a computation unit configured to compute median intensity values from the second intensity values for each of the plurality of predetermined areas and to compute an interpolation of the median intensity values to the original digital image size and to compute background compensated intensity for each object by subtracting the interpolated median intensity values from the determined first intensity values.

The computation unit might further be configured to arrange the computed median intensity values in a topological grid structure, preferably a median matrix, based on a position of the at least one second object within the plurality of predetermined areas.

The computation unit might further be configured to apply a region growing approach to the computed median intensity values of the plurality of predetermined areas. That is, the computation unit might further be configured to apply a region growing approach to the median matrix. As outlined above, the region growing approach might be applied in order to fill empty elements of a matrix representation of the median intensity values.

The computation unit is preferably further configured to apply a median filter to the computed median intensity values of the plurality of predetermined areas. That is, the computation unit is preferably further configured to apply a median filter to the median matrix.

The computation unit is can further be configured to apply a Gaussian filter to the computed median intensity values of the plurality of predetermined areas. That is, the computation unit is can further be configured to apply a Gaussian filter to the median matrix.

Computing of the interpolation might comprise a bilinear interpolation.

Thus, the present invention considers the challenging variance of the intensities by local processing and robust handling of outlier intensities, e.g. by the usage of the median.

Some preferred embodiments are now described with reference to the drawings. For explanation purpose, various specific details are set forth, without departing from the scope of the present invention as claimed.

Figure 1:
FIG. 1 illustrates a system according to one embodiment of the present invention.

FIG. 1 illustrates a system according to the present invention. The system comprises an intensity determining unit 100 and a computational unit 200 according to an exemplary embodiment of the present invention. The units are configured to execute one or more of the steps of the present invention. While the present invention is described using two independent units 100, 200, it is apparent that the independent units can also be part of one single "master" unit.

In a preferred embodiment of the present invention the intensity determining unit 100 is configured to determine first intensity values from the digital image for each object and second intensity values for the at least one second object within a plurality of predetermined areas.

The computation unit 200 is configured to compute median intensity values for each of the plurality of predetermined areas and to compute an interpolation of the median intensity values to the original digital image size and to compute background compensated intensity for each object by subtracting the median intensity values from the determined first intensity values.

The functionality of the intensity determining unit 100 and the computation unit 200 will be further described in terms of method steps in the following preferred embodiments of the present invention. It is obvious for a person skilled in the art that the following description of method steps gives rise to corresponding functions of the intensity determining unit 100 and the computation unit 200.

Figure 2:
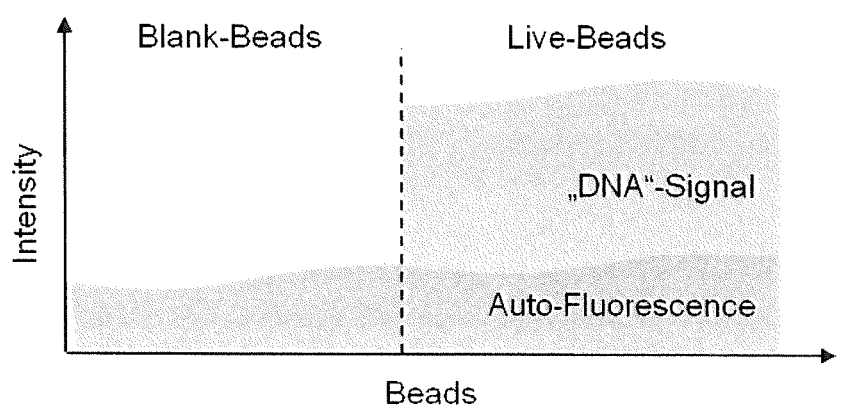
FIG. 2 illustrates the autofluorescence effect in a digital image according to the present invention.

FIG. 2 illustrates a typical intensity level for a live-bead (first object) and a blank-bead (second object) with the presence of autofluorescence. The blank-bead intensity is shown on the left side of the graph and the live-bead intensity is shown on the right side of the graph (separated by the dashed line). As can be seen, the intensity level of the blank-bead is not zero, as should be the case in an "ideal" case. However, the presence of emitted fluorescent light leads to autofluorescence even at the position of blank-beads. At the position of the live-bead, the intensity level that stems from autofluorescence is added to the intensity value due to the emission of fluorescence light ("DNA" signal).

In accordance with the present invention it is assumed that the first objects (live-beads) and second objects (blank-beads) are classified beforehand, i.e. it is determined beforehand which objects have received DNA strands and which do not. In other words, the classification of the beads, whether they are able to receive nucleotides with a fluorescent compound or not is already known to the method and system of the present invention and might be inputted into the intensity determining unit and/or the computational unit 200.

In a first step of the exemplary embodiment, the determination of median intensity values based on a sub-tile approach is executed. For this, the bead intensities are sorted in a grid, depending on the bead positions and bead state by using only blank-beads. That is, the autofluorescence typically is extracted from blank-beads, which are not populated with DNA. Based on the bead-positions a spatial grid is formed in order to ensure local processing, which reduces the impact of the vignetting effect. Here, the typical spatial resolution which is mapped on one grid element is 64×64 pixels. That is, one grid for each blank-bead position. However, the computation time might be saved by only taking a predetermined number of grids into account.

Next a median matrix is calculated by computing the median intensity value for each grid-cell (sub-tile). The median is used in order to compensate for outliers, thus to improve the robustness. Here outliers can originate from misclassified beads, e.g. when live-beads have been erroneously classified as blank.

Subsequently, empty elements of the median matrix are filled by a region growing approach, if necessary.

A surface smoothing might be applied in order to eliminate possible extreme values in the resulting median matrix by applying a median filtering (3×3), which might be followed by applying a Gaussian filter.

As the image has been subdivided into a plurality of grids the matrix of median intensity values has to be upscaled to the original image size, e.g. by bilinear interpolation in order to allow the extraction of a median value for each bead. That is, the goal is to have a corresponding median value (autofluorescence) for pixel of the original digital image. Therefore, the median matrix (e.g. 52×39) is enlarged by bilinear interpolation to the original digital image size (e.g. 3296× 2472 pixels).

Finally, the background correction for each bead intensity is performed by subtracting the corresponding median intensity value from the original intensity value. If computational power and time is not of the essence, the subtraction might be done for every pixel of the digital image. However, it is sufficient to only subtract the corresponding median intensity value from the original intensity value for each bead position as the bead positions.

The forgoing method steps of the preferred embodiment have been described as relating to DNA/RNA sequencing. However, as will be apparent to the person skilled in the art the present invention is not restricted to this field. It is clear that the solution of the present invention can be applied to numerous other technical fields, where fluorescent images are used and autofluorescence effects play a role. That is, the objects do not have to be beads as in this exemplary embodiment, but can also be any kind of fluorescent emitting objects in an image, wherein autofluorescence effects are present due to the fluorescent nature of the objects.

As the present invention may be embodied in several forms without departing from the scope or essential characteristics thereof, it should be understood that the above-described embodiments are not limited by any of the details of the foregoing descriptions, unless otherwise specified, but rather should be construed broadly within the scope as defined in the appended claims, and therefore all changes and modifications that fall within the present invention are therefore intended to be embraced by the appended claims.

Furthermore, in the claims the word "comprising" does not exclude other elements or steps, and the indefinite article "a" or "an" does not exclude a plurality. A single unit may fulfil the functions of several features recited in the claims. The terms "essentially", "about", "approximately" and the like in connection with an attribute or a value particularly also define exactly the attribute or exactly the value, respectively.

REFERENCES

[1]—https://www.themiofisher.comide/de/home/brands/product-brand/dynal.html.

The invention claimed is:

1. A computer implemented method for background compensation of a digital image, wherein the method comprises:
   determining first intensity values from the digital image for each object of at least one first object and at least one second object, the at least one first object having received at least one molecule comprising genetic information, the at least one second object having not received a molecule comprising genetic information, the at least one molecule being configured to receive a fluorescent compound, and the digital image being determined by an optical imaging system during emission of electromagnetic radiation by the fluorescent compound;
   determining second intensity values from the digital image for the at least one second object within a plurality of predetermined first areas, wherein the predetermined first areas comprise the at least one second object, and wherein one or more predetermined second areas do not contain the at least one second object;
   computing median intensity values from the second intensity values for each of the plurality of predetermined first areas;
   arranging the computed median intensity values in a topological grid structure based on a position of the at least one second object within the plurality of predetermined first areas, wherein the topological grid structure comprises at least one empty element at positions of the one or more predetermined second areas;
   applying a region growing approach to the computed median intensity values arranged in the topological grid structure of the plurality of predetermined first areas to fill the at least one empty element in the topological grid structure;
   interpolating the median intensity values to an original digital image size; and
   computing background compensated intensity values for each object by subtracting the interpolated median intensity values from the determined first intensity values.

2. The method according to claim 1, further comprising: applying a median filter to the computed median intensity values arranged in the topological grid structure of the plurality of predetermined first areas.

3. The method according to claim 1, further comprising: applying a Gaussian filter to the computed median intensity values arranged in the topological grid structure of the plurality of predetermined first areas.

4. The method according to claim 1, wherein interpolating the median intensity values to the original digital image size comprises a bilinear interpolation.

5. The method according to claim 1, wherein the at least one object is a bead configured to receive DNA or RNA.

6. The method according to claim 1, wherein the topological grid structure corresponds to a median matrix.

7. A non-transitory computer readable media having instructions stored thereon that, when executed by at least one computing device, cause the at least one computing device to perform operations comprising:
   determining first intensity values from a digital image for each object of at least one first object and at least one second object, the at least one first object having received at least one molecule comprising genetic information, the at least one second object having not received a molecule comprising genetic information, the at least one molecule being configured to receive a fluorescent compound, and the digital image being determined by an optical imaging system during emission of electromagnetic radiation by the fluorescent compound;
   determining second intensity values from the digital image for the at least one second object within a plurality of predetermined first areas, wherein the predetermined first areas comprise the at least one second object, and wherein one or more predetermined second areas do not contain the at least one second object;
   computing median intensity values from the second intensity values for each of the plurality of predetermined first areas;
   arranging the computed median intensity values in a topological grid structure based on a position of the at least one second object within the plurality of predetermined first areas, wherein the topological grid structure comprises at least one empty element at positions of the one or more predetermined second areas;
   applying a region growing approach to the computed median intensity values arranged in the topological grid structure of the plurality of predetermined first areas to fill the at least one empty element in the topological grid structure;
   computing an interpolation of the median intensity values to an original digital image size; and
   computing background compensated intensity values for each object by subtracting the interpolated median intensity values from the determined first intensity values.

8. The non-transitory computer readable media according to claim 7, wherein the operations further comprise:
   applying a median filter to the computed median intensity values arranged in the topological grid structure of the plurality of predetermined first areas.

9. The non-transitory computer readable media according to claim 7, wherein the operations further comprise:
   applying a Gaussian filter to the computed median intensity values arranged in the topological grid structure of the plurality of predetermined first areas.

10. The non-transitory computer readable media according to claim 7, wherein the computing of the interpolation comprises a bilinear interpolation.

11. The non-transitory computer readable media according to claim 7, wherein the topological grid structure corresponds to a median matrix.

12. A system for background compensation of a digital image, wherein the system comprises:
   an intensity determining unit configured to:
      determine first intensity values from the digital image for each object of at least one first object and at least one second object, the at least one first object having received at least one molecule comprising genetic information, the at least one second object having not received a molecule comprising genetic information, the at least one molecule being configured to receive a fluorescent compound, and the digital image being determined by an optical imaging system during emission of electromagnetic radiation by the fluorescent compound; and determine second intensity values for the at least one second object within a plurality of predetermined first areas, wherein the predetermined first areas comprise the at least one second object, and wherein one or more predetermined second areas do not contain the at least one second object; and a computation unit configured to:

compute median intensity values from the second intensity values for each of the plurality of predetermined first areas;

arrange the computed median intensity values in a topological grid structure based on a position of the at least one second object within the plurality of predetermined first areas, wherein the topological grid structure comprises at least one empty element at positions of the one or more predetermined second areas;

apply a region growing approach to the computed median intensity values arranged in the topological grid structure of the plurality of predetermined first areas to fill the at least one empty element in the topological grid structure;

compute an interpolation of the median intensity values to an original digital image size; and compute background compensated intensity for object by subtracting the interpolated median intensity values from the determined first intensity values.

13. The system according to claim 12, wherein the computation unit is further configured to apply a median filter to the computed median intensity values arranged in the topological grid structure of the plurality of predetermined first areas.

14. The system according to claim 12, wherein the computation unit is further configured to apply a Gaussian filter to the computed median intensity values arranged in the topological grid structure of the plurality of predetermined first areas.

15. The system according to claim 12, wherein the computing of the interpolation comprises a bilinear interpolation.

16. The system according to claim 12, wherein the topological grid structure corresponds to a median matrix.

* * * * *